United States Patent
Tokioka et al.

(10) Patent No.: US 8,342,056 B2
(45) Date of Patent: Jan. 1, 2013

(54) TELESCOPIC SHAFT AND VEHICLE STEERING APPARATUS

(75) Inventors: Ryoichi Tokioka, Osaka (JP); Hiroji Ueda, Osaka (JP); Mitsuharu Ozaki, Osaka (JP); Hiroaki Sougumo, Osaka (JP)

(73) Assignee: JTEKT Corporation, Osaka (JP)

( * ) Notice: Subject to any disclaimer, the term of this patent is extended or adjusted under 35 U.S.C. 154(b) by 1187 days.

(21) Appl. No.: 11/988,656

(22) PCT Filed: Jul. 13, 2006

(86) PCT No.: PCT/JP2006/313976
§ 371 (c)(1),
(2), (4) Date: Jan. 11, 2008

(87) PCT Pub. No.: WO2007/007838
PCT Pub. Date: Jan. 18, 2007

(65) Prior Publication Data
US 2010/0126300 A1 May 27, 2010

(30) Foreign Application Priority Data

Jul. 13, 2005 (JP) ................................. 2005-204750
Mar. 14, 2006 (JP) ................................. 2006-069491

(51) Int. Cl.
*B62D 1/18* (2006.01)
(52) U.S. Cl. ........................................................ 74/493
(58) Field of Classification Search .................... 74/493, 74/504, 510; 464/167, 168, 172
See application file for complete search history.

(56) References Cited

U.S. PATENT DOCUMENTS

| 3,112,625 | A | * | 12/1963 | Leto | ................................. 464/87 |
| 4,898,566 | A | | 2/1990 | Hakansson et al. | |
| 6,343,993 | B1 | * | 2/2002 | Duval et al. | ................... 464/167 |
| 7,338,382 | B2 | * | 3/2008 | Yamada | ........................ 464/167 |
| 7,753,800 | B2 | * | 7/2010 | Tokioka et al. | ............... 464/167 |
| 2006/0012161 | A1 | | 1/2006 | Yamada | |
| 2007/0157754 | A1 | | 7/2007 | Yamada | |
| 2009/0280914 | A1 | * | 11/2009 | Kakutani et al. | .............. 464/167 |

FOREIGN PATENT DOCUMENTS

| DE | 203 18 654 U1 | 3/2004 |
| DE | 103 59 962 A1 | 7/2005 |
| JP | 2632892 | 4/1997 |
| JP | 2001-050293 | 2/2001 |
| JP | 2003-247560 | 9/2003 |
| JP | 2004-142605 | 5/2004 |
| JP | 2005-114068 | 4/2005 |
| WO | WO-2005/070744 | 8/2005 |

* cited by examiner

*Primary Examiner* — Vicky Johnson
(74) *Attorney, Agent, or Firm* — Rabin & Berdo, P.C.

(57) ABSTRACT

A telescopic shaft (5) has an inner shaft (12) and a tubular outer shaft (13) that are fitted to each other so that they can move relative to each other in the axial direction and that they can transmit torque to each other. A plurality of balls (14) are aligned between respective raceway grooves (15; 16) of the inner shaft (12) and the outer shaft (13). Limiting mechanisms (20A; 20B) are provided that limit the amount of relative rotation to not more than a predetermined amount of the inner shaft (12) and the outer shaft (13) when a ball (14) comes off the raceway grooves (15; 16). The limiting mechanisms (20A; 20B) include a pair of engagement sections (21, 22; 23, 24) engageable with each other in a circumferential direction (C1). The engagement sections (21, 22; 23, 24) are provided at ridges (25, 26) and recesses (27, 28) that are adjacent to the raceway grooves (15; 16) of the inner shaft (12) and the outer shaft (13), respectively.

7 Claims, 5 Drawing Sheets

TELESCOPIC SHAFT AND VEHICLE STEERING APPARATUS

TECHNICAL FIELD

The present invention relates to a telescopic shaft and a vehicle steering apparatus using the same.

BACKGROUND ART

Telescopic shafts mentioned above are used as steering shafts for automobiles, for example.

Further, the telescopic shafts are used as intermediate shafts for connecting steering shafts for automobiles and steering mechanisms such as rack-and-pinion mechanisms. In this case, the telescopic function of the telescopic shaft is used for adjusting the length of the intermediate shaft for absorbing relative displacement between a steering gear and a steering column when a vehicle is traveling. Alternatively, the telescopic function is used for adjusting the length of the intermediate shaft when the intermediate shaft is assembled into the vehicle.

As this type of telescopic shaft, a telescopic shaft has been known that fits an inner shaft and a tubular outer shaft into each other with a plurality of rollable balls interposed between corresponding axial grooves of both the shafts.

It is considered to provide a circumferential stopper between the inner shaft and the outer shaft such that both the shafts can transmit torque to each other by circumferentially engaging with each other even when the ball comes off the axial groove.

For example, a telescopic shaft has been proposed whose inner and outer shafts are made polygonal in cross section (see Japanese Patent No. 2632892, for example).

DISCLOSURE OF INVENTION

Even if the cross-sectional shapes of the inner shaft and the outer shaft are made polygonal, however, a stress is intensively created at the corners of a polygon by torque input. In order to restrain the stress, the wall thickness of the tubular outer shaft must be increased. Therefore, the outer shaft is not easily flexed, so that the flexural rigidity of the telescopic shaft may be excessively increased.

An object of the present invention is to provide a telescopic shaft and a vehicle steering apparatus in which a stress created when torque is applied thereto is low, suitable torsional rigidity and smooth expansion and contraction can be attained, and torque can be transmitted even when a ball comes off.

In order to achieve the above-mentioned object, a preferred aspect of the present invention provides a telescopic shaft comprising an inner shaft and a tubular outer shaft that are fitted into each other so as to be relatively movable to each other in an axial direction and so as to be torque-transmittable to each other, raceway grooves that are formed on each of an outer peripheral surface of the inner shaft and an inner peripheral surface of the outer shaft and are opposed to each other, and a plurality of balls interposed between the opposed raceway grooves of the inner shaft and the outer shaft and aligned in an axial direction of the inner shaft and the outer shaft. The telescopic shaft comprises a ridge formed on either one of the inner shaft and the outer shaft and extending in the axial direction of the one shaft, a recess formed on the other one of the inner shaft and the outer shaft and extending in the axial direction of the other shaft, and a limiting mechanism for limiting the amount of relative rotation between the inner shaft and the outer shaft to not more than a predetermined amount when the ball comes off at least one of the opposed raceway grooves. The ridge is adjacent to the raceway groove of the one shaft in the circumference direction of the one shaft. The recess is adjacent to the raceway groove of the other shaft in the circumference direction of the other shaft. The limiting mechanism includes a pair of engagement sections engageable with each other in a circumferential direction of the inner shaft and the outer shaft. The one of the paired engagement sections is provided at the ridge, and the other engagement section is provided at the recess.

According to this aspect, when the ball comes off the raceway groove, the paired engagement sections engage with each other in the circumferential direction, so that the relative amount of rotation between the inner shaft and the outer shaft is limited to not more than the predetermined amount.

Since the paired engagement sections for limiting the relative amount of rotation between the inner shaft and the outer shaft to not more than the predetermined amount are arranged at the ridge adjacent to the raceway groove of the one shaft and the recess adjacent to the raceway groove of the other shaft, respectively, a relatively wide area excluding the raceway grooves and the engagement sections in the circumferential direction of the inner shaft and the outer shaft is a non-engagement area between the inner shaft and the outer shaft.

That is, the lengths in the circumferential direction of portions that need not engage with each other of the inner shaft and the outer shaft can be kept large. As a result, a stress in the outer shaft can be reduced, and the flexural rigidity of the outer shaft can be reduced and thus, the outer shaft is easily flexed. When the ball is assembled in a preloaded state, a sliding load is not easily affected by the variation in the dimensions of the raceway grooves.

Furthermore, there is no need to make the respective cross-sectional shapes of the inner shaft and the outer shaft in polygon as in the conventional example. The cross-sectional shapes of the inner shaft and the outer shaft may be circular or substantially circular. Therefore, when the telescopic shaft according to the present invention is used for an intermediate shaft for transmitting a steering torque for a steering member in a vehicle, for example, there are advantages described below. That is, although the intermediate shaft is inserted through an insertion hole of a partition plate for separating the interior and the exterior of a vehicle chamber, and an area between the insertion hole and the intermediate shaft is sealed with an annular floor seal, it is preferable that the shape of a portion where the floor seal and the telescopic shaft are fitted into each other can be made substantially circular.

BEST MODE FOR CARRYING OUT THE INVENTION

Preferred embodiments of the present invention will be described while referring to the accompanying drawings.

Figure 1:
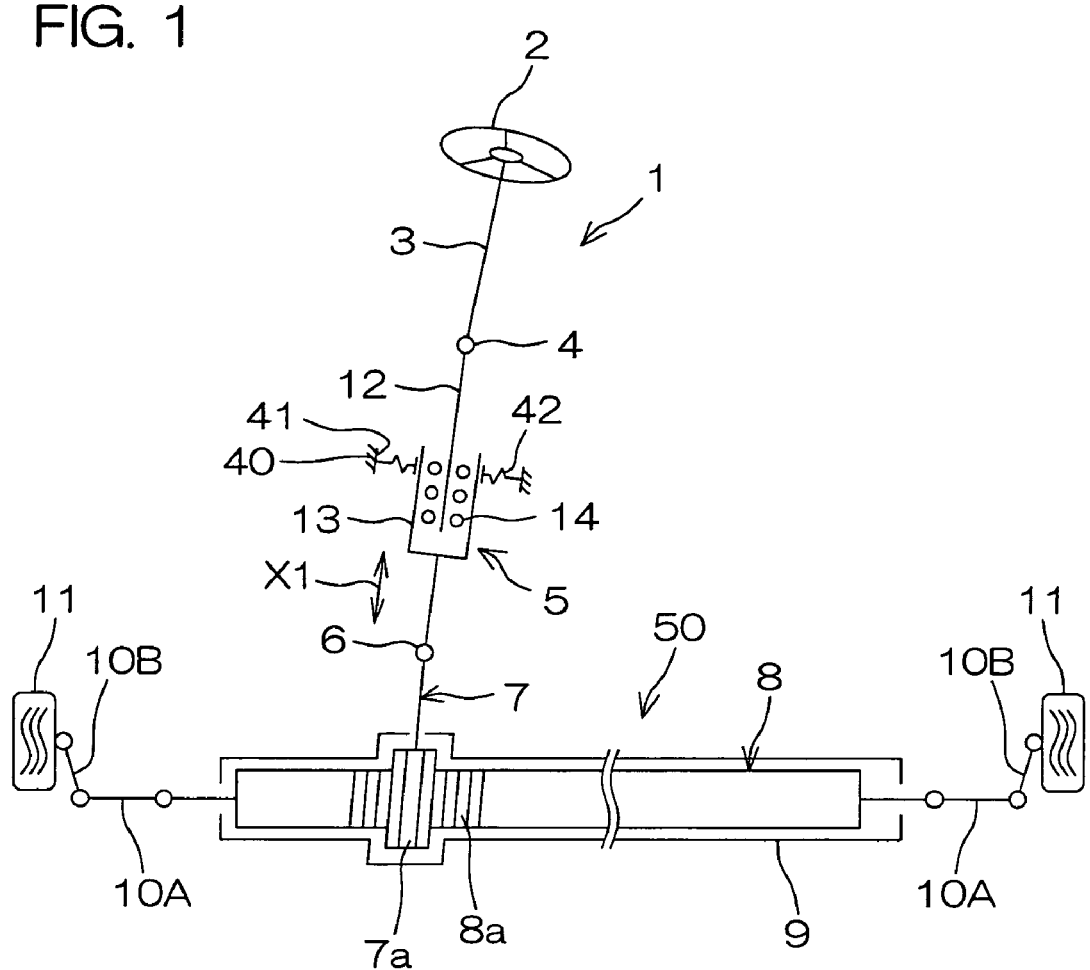
FIG. 1 is a schematic block diagram showing a vehicle steering apparatus in which a telescopic shaft according to an embodiment of the present invention is applied to an intermediate shaft.

FIG. 1 is a schematic block diagram showing a vehicle steering apparatus in which a telescopic shaft according to an embodiment of the present invention is applied to an intermediate shaft. A vehicle steering apparatus 1 has a steering shaft 3 connected to a steering member 2 such as a steering wheel, an intermediate shaft 5 serving as a telescopic shaft connected to the steering shaft 3 through a universal joint 4, a pinion shaft 7 connected to the intermediate shaft through a universal joint 6, and a rack bar 8 serving as a steerable shaft having rack teeth 8a meshed with pinion teeth 7a provided in the vicinity of an end of the pinion shaft 7 and extending in a left-and-right direction of an automobile. A steering mechanism 50 is provided by a rack-and-pinion mechanism from the pinion shaft 7 and the rack bar 8. The intermediate shaft 5 is inserted through an insertion hole 41 of a partition plate 40 for separating the interior and the exterior of a vehicle chamber, and an area between the insertion hole 41 and the intermediate shaft 5 is sealed with an annular floor seal 42.

Although in the present embodiment, description is made in conformity with a case where the telescopic shaft is applied to the intermediate shaft 5, the telescopic shaft according to the present invention may be applied to the steering shaft 3 so as that the steering shaft 3 performs a telescopic adjustment function and a shock absorption function.

The rack bar 8 is supported so as to be movable linearly back and forth through a plurality of bearings (not shown) within a housing 9 fixed to a vehicle body. Both ends of the rack bar 8 project toward both the sides of the housing 9, and a tie rod 10A is coupled to each of the ends. Each of the tie rods 10A is connected to a corresponding wheel 11 through a corresponding knuckle arm 10B.

The intermediate shaft 5 comprises an inner shaft 12 serving as an upper shaft and a tubular outer shaft 13 serving as a lower shaft. The inner shaft 12 and the outer shaft 13 are fitted into each other so as to be slidable in an axial direction X1 and so as to be torque-transmittable to each other through balls 14 providing a rolling element serving as a torque transmission element.

Figure 2:
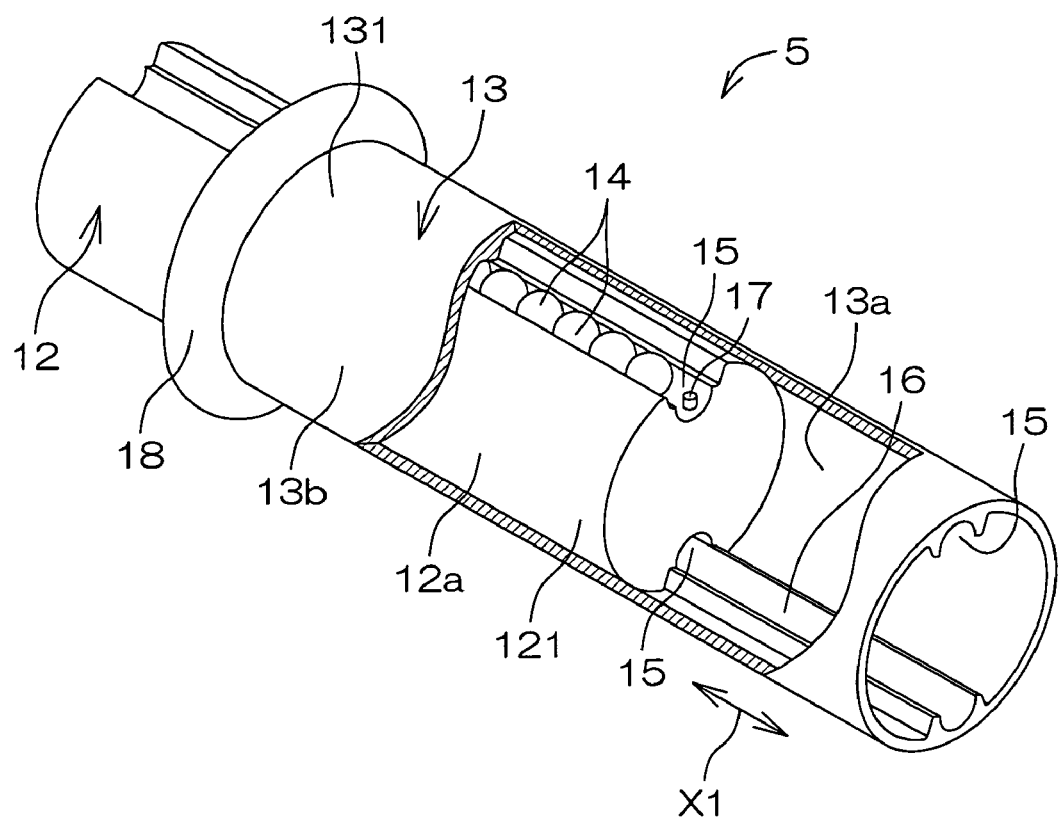
FIG. 2 is a partially cut-away perspective view of the intermediate shaft.
Figure 3:
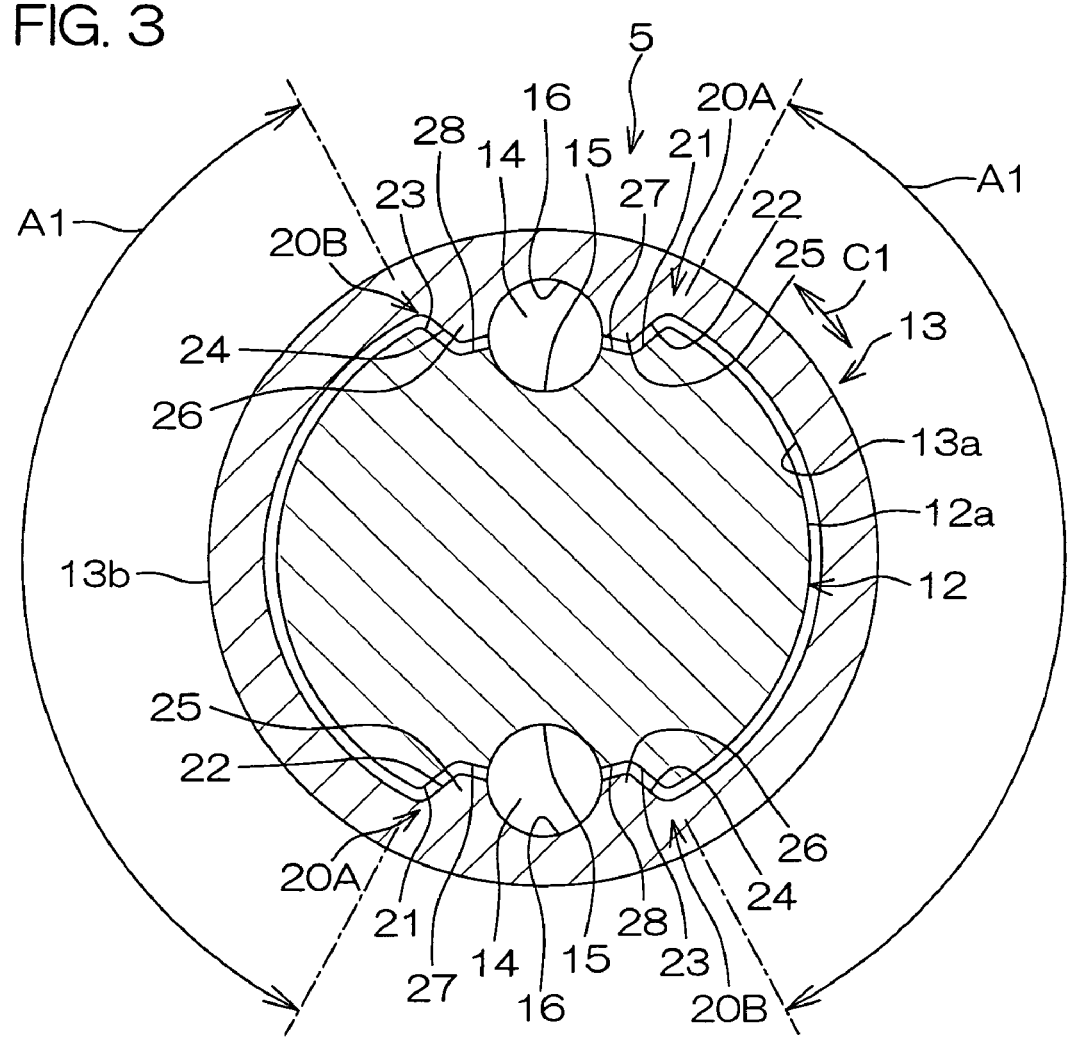
FIG. 3 is a cross-sectional view of the intermediate shaft.

As shown in FIG. 2 that is a partially cut-away perspective view of the intermediate shaft 5 and FIG. 3 that is a cross-sectional view of the intermediate shaft 5, at least a pair of raceway grooves 15 and 16 extending in the axial direction X1 is formed on an outer peripheral surface 12a of the inner shaft 12 and an inner peripheral surface 13a of the outer shaft 13.

The raceway grooves 15 and 16 that are paired with each other are opposed to each other in a radial direction of both the shafts 12 and 13, and the balls 14 are interposed between the raceway grooves 15 and 16. A raceway for the balls 14 is directly formed on an inner surface of each of the raceway grooves 15 and 16. An outer peripheral surface 13b of the outer shaft 13 is formed into a cylindrical surface.

The balls 14 align in the axial direction X1 of both the shafts 12 and 13, as shown in FIG. 2. Although holders each having holding holes for holding the plurality of aligned balls 14 may be provided, description is made in conformity with a case where no holders are provided in the present embodiment.

At an end 121 of the inner shaft 12, a projection 17 serving as a stopper for preventing the balls 14 from coming off the raceway groove 15 is formed on the raceway groove 15. An annular dust cover 18 for sealing an area between an end 131 of the outer shaft 13 and the inner shaft 12 is fitted into the end 131 of the outer shaft 13. A circular arc-shaped clip, which is not illustrated, serving as a stopper for preventing the balls 14 from coming off the raceway groove of the outer shaft 13 is fitted into the end 131 of the outer shaft 13. This clip has projections (not shown) respectively projecting toward the raceway grooves 16 of the outer shaft 13.

As shown in FIG. 3, the diameter of the tubular outer shaft 13 is elastically expanded having the ball 14 interposed between the paired raceway grooves 15 and 16, and the ball 14 is urged inward in the radial direction of the outer shaft 13 by an elastic restoring force of the outer shaft 13. As a result, the ball 14 is elastically held between the inner shaft 12 and the outer shaft 13. That is, the ball 14 is interposed having a radial preload applied thereto between the inner shaft 12 and the outer shaft 13. The inner shaft 12 and the outer shaft 13 are elastically connected to each other in a circumferential direction through the preloaded ball 14.

Furthermore, the intermediate shaft 5 comprises a pair of limiting mechanisms 20A and 20B for limiting the relative amount of rotation between the inner shaft 12 and the outer shaft 13 to not more than a predetermined amount if the ball comes off the raceway grooves 15 and 16. The one limiting mechanism 20A limits the relative amount of rotation to not more than a predetermined amount when the inner shaft 12 is rotated in a counterclockwise direction relative to the outer shaft 13. The other limiting mechanism 20B limits the relative amount of rotation to not more than the predetermined amount when the inner shaft 12 is rotated in a clockwise direction relative to the outer shaft 13.

The one limiting mechanism 20A comprises a pair of engagement sections 21 and 22 provided on the inner shaft 12 and the outer shaft 13, respectively and engageable with each other in a circumferential direction C1. Similarly, the other limiting mechanism 20B comprises a pair of engagement sections 23 and 24 provided on the inner shaft 12 and the outer shaft 13, respectively and engageable with each other in the circumferential direction C1.

A pair of ridges 25 and 26 axially extending is formed on an inner peripheral surface 13a of the outer shaft 13. The pair of ridges 25 and 26 is adjacent to the raceway groove 16 of the outer shaft 13 in such a manner that the raceway groove 16 is sandwiched therebetween in the circumferential direction. That is, the raceway groove 16 is formed between the paired ridges 25 and 26.

On the other hand, a pair of recesses 27 and 28 is formed on the inner shaft 12 so as to extend axially. The pair of recesses 27 and 28 is adjacent to the raceway groove 15 of the inner shaft 12 in such a manner that the raceway groove therebetween in the circumferential direction, and is fitted into the pair of ridges 25 and 26 of the outer shaft 13. However, the ridges 25 and 26 and the recesses 27 and 28, which correspond to each other, do not engage with each other when transmitted torque between the inner shaft 12 and the outer shaft 13 is less than a predetermined amount, while engaging with each other depending on the direction of relative rotation between the inner shaft 12 and the outer shaft 13 when the transmitted torque reaches not less than the predetermined amount.

Figure 4:
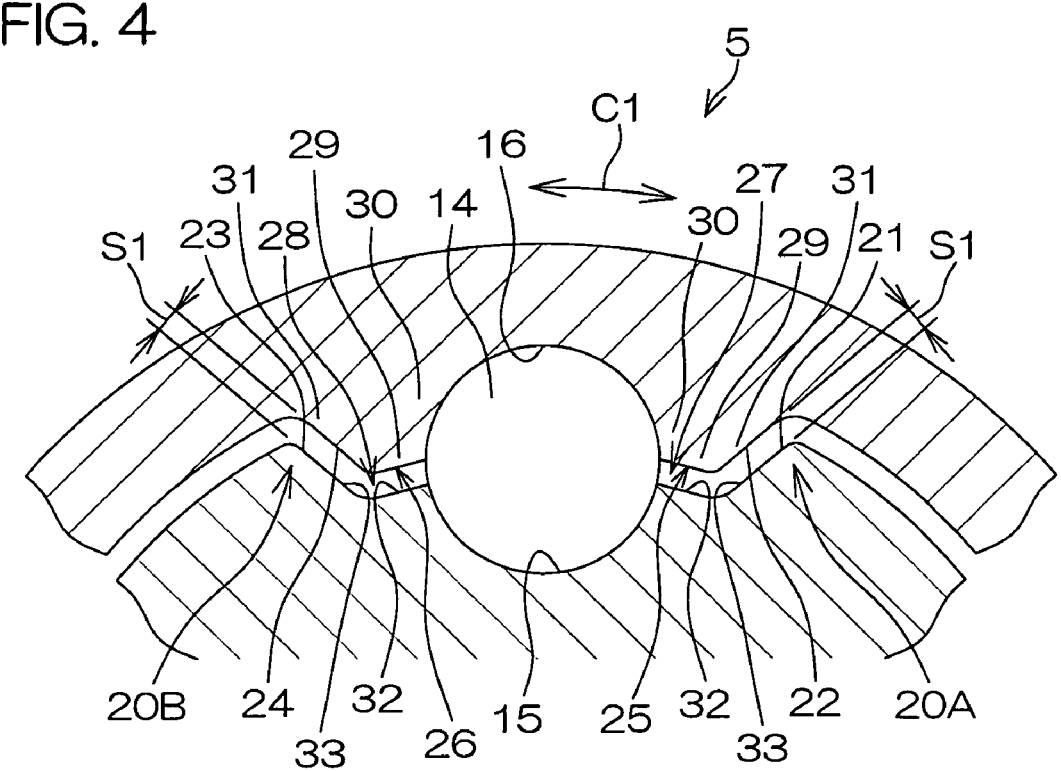
FIG. 4 is an enlarged sectional view of a principal part of the intermediate shaft.

Referring to FIG. 4 that is an enlarged view, each of the paired ridges 25 and 26 has a top 29 and paired sides 30 and 31 arranged on both sides having the top sandwiched therebetween. The sides 30 of the pair of ridges 25 and 26 are opposed to the circumferential direction C1, and the sides define the raceway groove 16.

On the other hand, each of the paired recesses 27 and 28 has a bottom 32 connected to the raceway groove 15 and an inner wall 33 raised a predetermined distance apart from the raceway groove 15 in the circumferential direction C1.

The top 29 of each of the ridges 25 and 26 and the bottom 32 of the corresponding recess 27 or 28 respectively are spaced a distance apart in the circumferential direction C1 of the inner shaft 12.

The side 31 of the ridge 25 and the inner wall 33 of the recess 27 opposed thereto are provided with the paired engagement sections 22 and 21, respectively in the first limiting mechanism 20A, and the side 31 of the ridge 26 and the inner wall 33 of the recess 28 opposed thereto are provided with the paired engagement sections 24 and 23, respectively in the second limiting mechanism 20B.

In the intermediate shaft 5 without load, predetermined circumferential clearances S1 are provided between the paired engagement sections 21 and 22 and the paired engagement sections 23 and 24, respectively.

The circumferential clearance S1 without load is set to a value larger than a circumferential clearance (not shown) between the raceway grooves 15 and 16 and the ball 14, and is set to a value smaller than the diameter of the ball 14.

According to the present embodiment, torque is transmitted to an area between the inner shaft 12 and the outer shaft 13 through the ball when transmitted torque in the intermediate shaft 5 is relatively small, while being transmitted through either one of the limiting mechanisms 20A and 20B and the ball 14 depending on the rotation direction when the transmitted torque is increased to not less than a predetermined value.

If the ball 14 comes off the raceway grooves 15 and 16, the paired engagement sections 21 and 22, and the paired engagement sections 23 and 24 in the limiting mechanisms 20A and 20B engage with each other, respectively in the circumferential direction, so that the relative amount of rotation between the inner shaft 12 and the outer shaft 13 can be limited to not more than a predetermined amount. Consequently, fail-safe can be attained without interference with steering. Further, a driver can feel the existence of play in the rotation direction to perceive the occurrence of an abnormality when performing a rotating operation of the steering member 2.

The limitation by the limiting mechanisms 20A and 20B is substantially attained by setting the circumferential clearance S1 between the engagement sections 21 and 22 or between the engagement sections 23 and 24 without load to a value larger than a circumferential clearance (not shown) between the raceway groove 15 and 16 and the ball 14, and smaller than the diameter of the ball 14.

Since the pair of engagement sections 21 and 22 and the pair of engagement sections 23 and 24 provided in the limiting mechanisms 20A and 20B are provided on the ridges 25 and 26 and the recesses 27 and 28 arranged adjacent to each of the raceway grooves 15 and 16, respectively, as for the circumferential direction C1 of the outer shaft 13, a wide area A1 excluding the raceway groove 16 and the ridges 25 and 26 becomes a non-engagement area where the outer shaft 13 need not engage with the inner shaft 12, as shown in FIG. 3. That is, the circumferential length of a portion which need not engage with the inner shaft 12 of the outer shaft 13 can be kept large. As a result, the flexural rigidity of the outer shaft 13 can be reduced and thus, the outer shaft 13 is easily flexed. When the ball 14 is assembled in a preloaded state as in the present embodiment, a sliding load is not easily affected by the variation in the dimensions of the raceway grooves 15 and 16.

Particularly, the outer peripheral surface 13b of the outer shaft 13 is formed into a cylindrical surface, the outer shaft 13 can be formed in a cylindrical shape having a uniform thickness and being thin-walled in the area A1. Consequently, stress concentrations are restrained so that the wall thickness of the output shaft 13 can be made smaller, as compared with that in a case where the outer peripheral surface has a projection or has a polygonal shape. Moreover, the circumferential length of a portion which need not engage with the inner shaft 12 of the outer shaft 13 is large. Therefore, the flexural rigidity of the outer shaft 13 can be reduced, combined with possible reduction in the wall thickness and thus, the outer shaft 13 is easily flexed. When the ball 14 is assembled in a preloaded state as in the present embodiment, a sliding load is not easily affected by the variation in the dimensions of the raceway grooves 15 and 16. As a result, a stable sliding load can be obtained.

Since the outer peripheral surface 13b of the outer shaft 13 is formed into a cylindrical surface, an attachment need not be interposed between the outer shaft 13 and a floor seal 42 when the outer shaft 13 is inserted into the floor seal 42, which allows to simplify the configuration.

Figure 5:
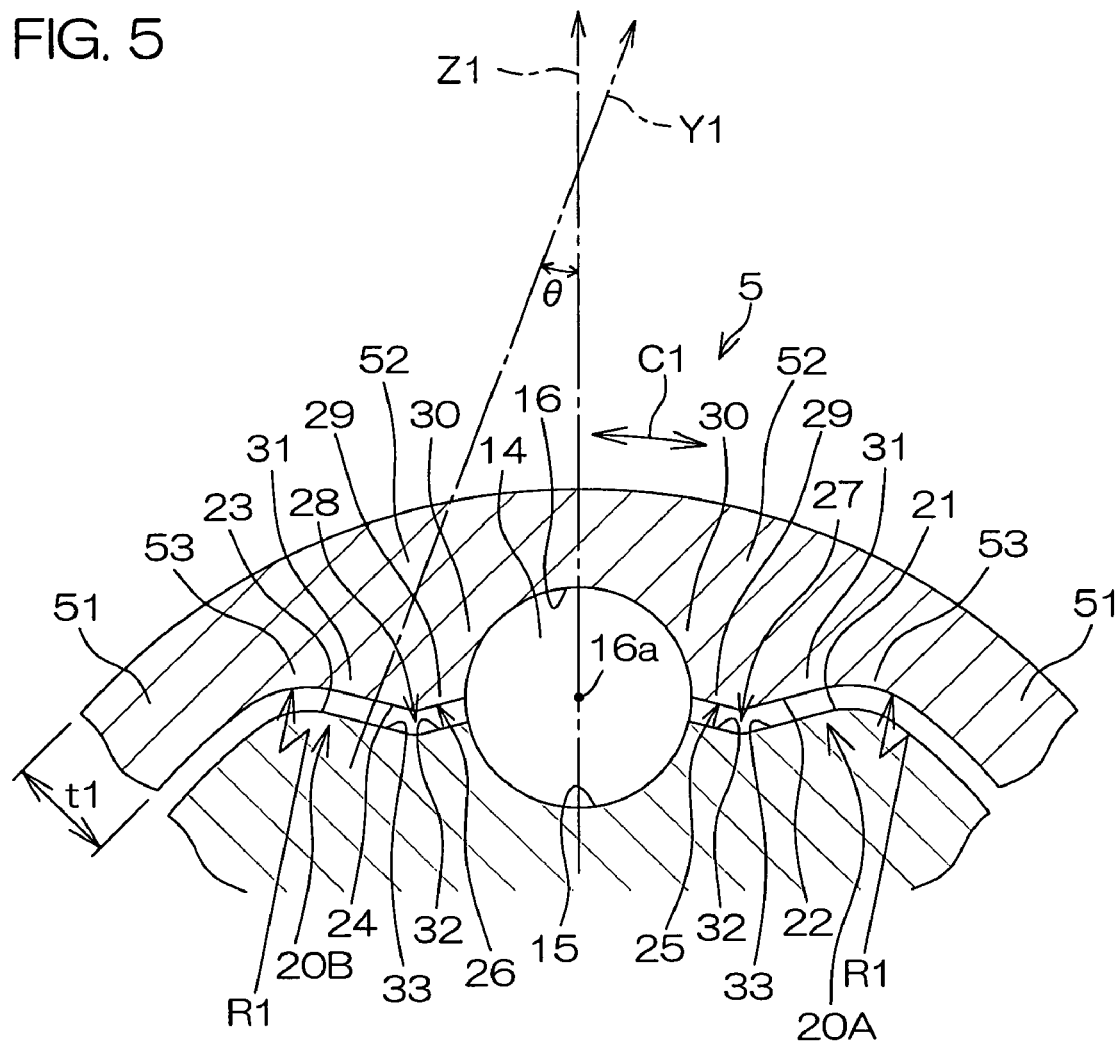
FIG. 5 is an enlarged sectional view of a principal part of an intermediate shaft serving as a telescopic shaft according to another embodiment of the present invention.

FIG. 5 illustrates still another embodiment of the present invention. Referring to FIG. 5, the present embodiment is characterized by the following.

That is, an angle $\theta$ formed between a direction Y1 in which sides 31 of ridges 25 and 26 of an outer shaft 13 and inner walls 33 of recesses 27 and 28 thereof are opposed to each other, and a radial direction Z1 of the outer shaft 13 passing through a center of curvature 16a of a raceway groove 16 between the ridges 25 and 26 is within a range of 10 degrees to 30 degrees) ($10° \leq \theta \leq 30°$). Since this alleviates the change in the wall thickness of the outer shaft 13, when the outer shaft 13 is formed by a plurality of pull-out processes, the degree of processing (the amount of change in a cross-sectional shape) in each of the pull-out processes can be reduced. Consequently, the precision of the shape of the outer shaft 13 is improved, which allows to reduce the number of pull-out processes.

Furthermore, the outer shaft 13 has a thin-walled section 51 having a relatively small thickness and a thick-walled section 52 having a relatively large thickness to form a ridge. The radius of curvature R1 of a connection section 53 for connecting the thin-walled section 51 and the thick-walled section 52 on an inner peripheral surface 13a of the outer shaft 13 is made larger than the thickness ti of the thin-walled section 51. Since this allows to alleviate stress concentrations, the strength and the durability of the outer shaft 13 can be improved.

The present invention is not limited to the above-mentioned embodiment. For example, ridges 25 and 26 may be provided on an outer peripheral surface 12a of an inner shaft 12, and recesses 27 and 28 may be provided on an inner peripheral surface 13a of an outer shaft 13. In the case, the outer peripheral surface 13b of the outer shaft 13 is provided with ridges projecting outward in its portions corresponding to the recesses 27 and 28.

Furthermore, a tubular shaft may be used as the inner shaft 12.

While the invention has been described in greater details with reference to the specific embodiments thereof, it is to be understood that changes, modifications and equivalents will occur to those skilled in the art who have understood the above contents. The scope of the invention, therefore, is defined by the appended claims and their equivalents.

The present application corresponds to Japanese Patent applications No. 2005-204750 filed with the Japanese Patent Office on Jul. 13, 2005 and No. 2006-069491 filed with the Japanese Patent Office on Mar. 14, 2006, the disclosures of which are hereinto incorporated by reference.

The invention claimed is:

1. A telescopic shaft comprising:
an inner shaft and a tubular outer shaft that are fitted into each other so as to be relatively movable to each other in an axial direction and so as to be torque-transmittable to each other;
raceway grooves that are formed on each of an outer peripheral surface of the inner shaft and an inner peripheral surface of the outer shaft and are opposed to each other;
a plurality of balls interposed between the opposed raceway grooves of the inner shaft and the outer shaft and aligned in an axial direction of the inner shaft and the outer shaft;
a pair of ridges formed on either one of the inner shaft and the outer shaft and extending in the axial direction of the one shaft;
a pair of recesses formed on the other one of the inner shaft and the outer shaft and extending in the axial direction of the other shaft; and
at least one pair of limiting mechanisms configured to limit the amount of relative rotation between the inner shaft and the outer shaft to not more than a predetermined amount when the ball comes off at least one of the opposed raceway grooves,
the pair of ridges being adjacent to the raceway groove of the one shaft in the circumference direction of the one shaft,
the pair of recesses being adjacent to the raceway groove of the other shaft in the circumference direction of the other shaft,
each of the at least one pair of limiting mechanisms including a pair of engagement sections engageable with each other in a circumferential direction of the inner shaft and the outer shaft,
one of the pair of engagement sections being provided at one of the pair of ridges, and the other of the pair of engagement sections being provided at one of the pair of recesses,
each of the pair of ridges having a first side and a second side,
the raceway groove of the other one of the inner shaft and the outer shaft being formed between the first sides of the pair of ridges,
each of the pair of recesses having an inner wall opposed to the second side of the pair of ridges, the inner walls having a predetermined circumferential clearance apart from the second side of the pair of ridges in the circumferential direction of the inner shaft and the outer shaft,
each pair of engagement sections being provided on the second side of the corresponding ridge and the inner wall of the corresponding recess,
the circumferential clearance between the second side of the corresponding ridge and the inner wall of the corresponding recess being larger than a circumferential clearance between the raceway grooves and the ball and being smaller than a diameter of the ball when the telescopic shaft is without load,
the outer shaft comprising a first area and a remaining second area,
the raceway grooves and either one of the pair of ridges or one of the pair of recesses being provided in the first area,
the outer peripheral surface and the inner peripheral surface in the second area of the outer shaft being cylindrical surfaces,
a circumferential length of the second area being larger than a circumferential length of the first area, and
one of the raceway grooves being formed directly on the inner shaft, and one of the raceway grooves being formed directly on the outer shaft.

2. The telescopic shaft according to claim 1, wherein
the pair of ridges is provided on the outer shaft, and
the direction in which the second side of each of the pair of ridges and the corresponding inner wall of the pair of recesses are opposed to each other forms an angle in a range of 10 degrees to 30 degrees to a radial direction of the outer shaft which passes through the center of curvature of the raceway groove adjacent to the pair of ridges.

3. A vehicle steering apparatus that transmits a steering torque for a steering member to a steering mechanism using the telescopic shaft according to claim 2.

4. The telescopic shaft according to claim 1, wherein
the outer shaft includes a section having a relatively small thickness, a section having a relatively large thickness to form the ridge, and a connection section for connecting the section having the relatively small thickness and the section having the relatively large thickness to each other, and
the radius of curvature of the connection section on the inner peripheral surface of the outer shaft is made larger than the thickness of the section having the relatively small thickness.

5. A vehicle steering apparatus that transmits a steering torque for a steering member to a steering mechanism using the telescopic shaft according to claim 4.

6. A vehicle steering apparatus that transmits a steering torque for a steering member to a steering mechanism using the telescopic shaft according to claim 1.

7. A vehicle steering apparatus that transmits a steering torque for a steering member to a steering mechanism using the telescopic shaft according to claim 1.

* * * * *